May 1, 1951   C. W. MOTT   2,551,454
AUXILIARY POWER TRANSMITTING APPARATUS FOR TRACTORS
Filed Sept. 10, 1945   4 Sheets-Sheet 1

Inventor:
Carl W. Mott

Patented May 1, 1951

2,551,454

UNITED STATES PATENT OFFICE 2,551,454

AUXILIARY POWER-TRANSMITTING APPARATUS FOR TRACTORS

Carl W. Mott, La Grange, Ill., assignor to International Harvester Company, a corporation of New Jersey Application September 10, 1945, Serial No. 615,329

3 Claims. (Cl. 74—764)

This invention concerns power transmitting apparatus serviceable as a power lift for tractors and the like and relates particularly to a reversibly drivable gearing and a braking control for certain elements thereof for determining the direction of power transmission.

An object of this invention is the provision of an auxiliary power transmitting apparatus utilizing planetary gearing controllable by selectively applying braking force to brake drums thereof to cause a driven part of the apparatus to be driven in either of opposite directions from a constantly rotatable driving structure.

Another object is the provision of a planetary gearing arrangement wherein the drums brakable to incur opposite movement of the driven part are coaxial and adjacent and tend to rotate in opposite directions to adapt braking thereof by bands having anchored ends and free ends which are movable in opposite directions for winding the bands onto the drums in the direction of drum rotation tendencies, whereby rotation of the drums supplements the application of each band by a control which is oppositely movable from a neutral position in which neither band is applied. The arrangement is one facilitating ease of operation manually whereby an operator can operate a finger-gripped lever for movement in opposite directions to obtain correlated movement of the driven part.

Another object is the provision of an auxiliary power transmitting apparatus employing planetary gearing for driving an internally threaded member in selectively opposite directions to advance or retract an exteriorly threaded member meshed with the internally threaded member and telescopic with a hollow driving structure, and a casing having a bearing for a cross-head constrained for advancement and retraction with the exteriorly threaded member.

Another object is the provision of a floating lever assembly by means of which controlling movement is applied to the brake drum bands both manually and by virtue of the resulting movement of the driven part of the apparatus to release each band and thereby cause cessation of movement of said driven part when it is advanced or retracted an amount correlated with the amount of advance or retraction of a manual control.

Another object is the provision of a novel arrangement of auxiliary power transmitting apparatus mounted upon the body of a tractor rearwardly of a clutch containing compartment thereof and employing separately engine-driven components which receive power from the engine through a shaft geared to a part rotatable with the driven part of the clutch within such housing and extending rearwardly exteriorly of the tractor body into mutual driving relation with said components.

A further object is the provision of a novel eccentrically mounted bearing for the aforesaid rearwardly extending shaft for displacing the front end of the shaft to control the meshed or demeshed relation thereof with respect to a driving gear therefor in the clutch compartment incident to flexing the shaft pursuant to incurring such lateral displacement.

Still a further object is the provision of a new form of brake band having a substantially cylindrical formation in its relaxed condition and disposed within a cylindrical portion of the power transmission apparatus casing to limit the extension of such band, together with anchorage means for an end of the band and means for displacing the other end of the band circumferentially to contract the same onto a brake drum of the apparatus.

Still another object of the invention is the provision of a new generally cylindrical plural convolution brake band formed from a cylindrical member having notches in opposite end portions at circumferentially separate positions to leave an intervening portion of the member between such notches and having a circumferential groove extending around the member between the bottoms of the notches oppositely from the intervening portion.

These and other desirable objects inherent and encompassed by the invention will be more fully comprehended upon reading the ensuing description with reference to the drawings, wherein.

The power transmitting apparatus herein disclosed embodies two identical units A and B, each having a casing Ca mounted on a body 11 of a wheel tractor. Said tractor has rear rubber tire carrying traction wheels 12 rotatable about an axis X. The wheels 12 are conventionally driven from an engine E through a clutch C, a clutch driven shaft (not shown) extending rearwardly from the clutch through the hollow body 11, change-speed gearing (not shown) within a gearing compartment 13 forming the rear end of the body 11, and the usual differential gearing driven from the tail shaft of the transmission.

Power is transmitted to each unit A and B of the auxiliary power transmitting apparatus from a gear 14 in the clutch containing compartment 15 and which is mounted on and is constrained for rotation with the clutch casing 16 which rotates constantly with the engine crank shaft. Power from the gear 14 reaches the apparatus through a companion gear 17, a shaft 18 constrained for rotation with the gear 17, a gear 19, Fig. 2, constrained for rotation with the rear end of the shaft 18, and driving gears 21 of each of the units A and B that mutually mesh with said gear 19.

Figure 1:
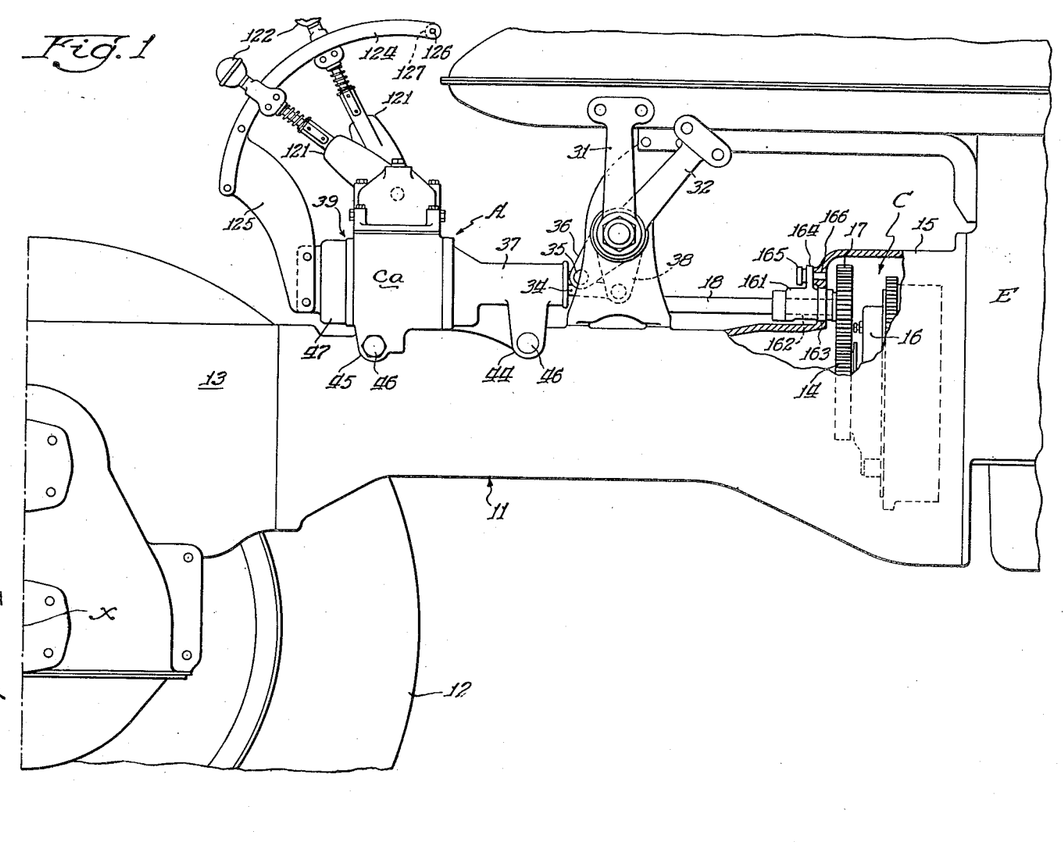
Fig. 1 is a side elevational view of an auxiliary power transmitting apparatus embodying a preferred form of the invention, the apparatus being illustrated upon the body of a tractor which is shown fragmentarily in side elevation with parts of the body broken away at the clutch compartment to disclose the driving connection between a clutch mounted gear and the apparatus.
Figure 2:
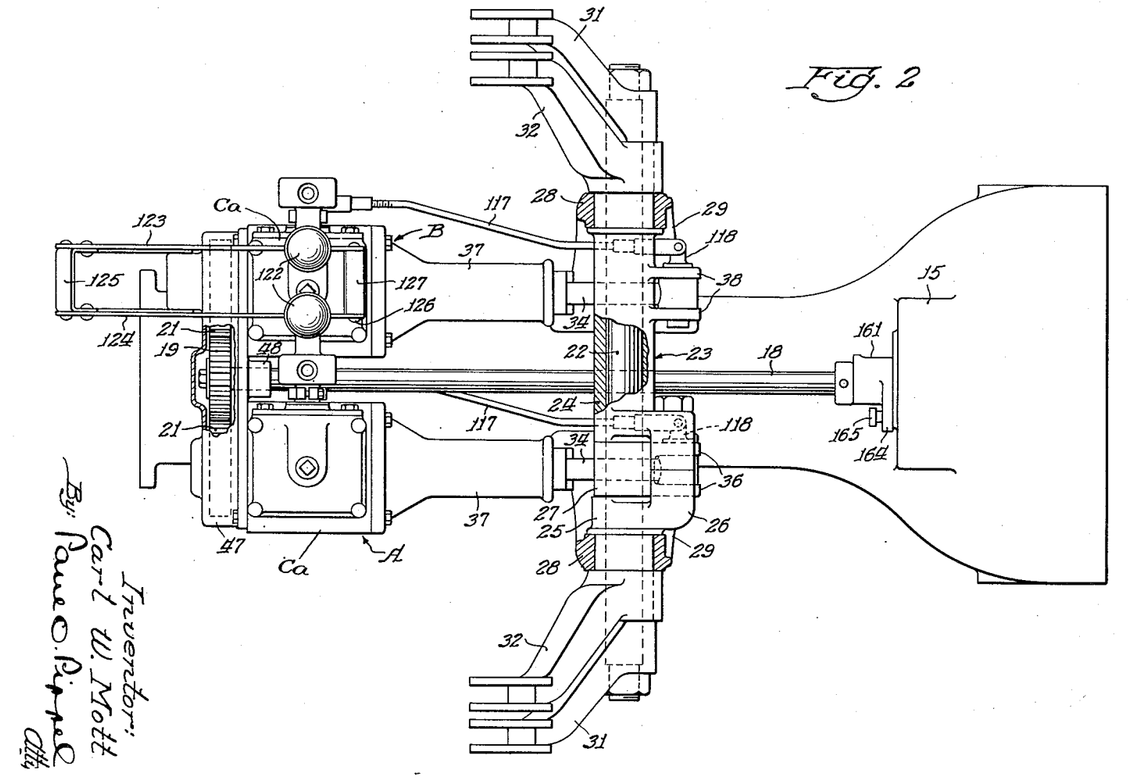
Fig. 2 is a plan view of the apparatus shown in Fig. 1.

Two units, A and B, are employed in the present installation for respectively operating concentric rockshafts 22 and 23, Figs. 1 and 2. Rockshaft 23 has sleeve portions 24 and 25, Fig. 2, joined by a bridge portion 26 and spaced at opposed ends for receiving a collar 27 which is constrained for rotation with the inner of said shafts, 22. Rock-shaft 23 is pivotally carried in bearings 28 at opposite sides of the tractor body 11 and which bearings are formed in upper end portions of arms 29 of a bracket secured to the tractor body. Rock-shaft arms 31 for the attachment of implement operating rods or the like are constrained for rotation with the inner rock-shaft 22 while similar arms 32 are constrained for rotation with the outer sleeve-like shaft structure 23. Unit A has a cross-head 33, Fig. 3, for pivoting the rock-shaft structure 22 through a connecting rod 34, the front end of which is connected by a pin 35 with a bifurcated arm structure 36 integral with the collar 27 which is fixed for rotation with said shaft. A similar cross-head (not shown) in a cross-head guide bearing 37 of unit B is connected by a connected rod 34 with a bifurcated arm structure 38 on the rock-shaft structure 23 for pivoting this structure pursuant to fore and aft movement of said cross-head in its guide bearing.

Since the two units A and B are identical, a detail construction of the unit A will suffice for both. Referring therefore to the unit A illustrated in Figs. 3 to 8, the casing Ca of this unit will be seen to have a lower main portion 39 shown in Figs. 3 and 5 in coaxial relation with planetary gearing contained therein. An upper portion 41 of the casing for containing and supporting controls for the planetary gearing is communicative with the main portion of the casing through an intermediate sheet-like casing portion or part 42 assembled between the portions or parts 39 and 41. The cross-head guide bearing 37 is formed integrally with a front end casting 43 of the casing. This front end casting has an apertured ear 44 which together with an apertured ear 45 on the main part of the casing serves as attaching means receivable of cap screws 46, Fig. 1, for securing the casing to the tractor body 11. The back end of the casing main portion is closed by an end casting 47. Casting 47 covers the back ends of casings in both units A and B, as illustrated in Fig. 2, and also serves to enclose the two gears 21 and the driving gear 19 therefor. A bearing 48 on the front wall of casting 47 between the units A and B journals the rear end portion of the drive shaft 18.

A driving structure 49 of the power transmitting unit A includes the gear 21 of such unit and a tubular member 51 having such gear 21 keyed to a rear end portion thereof as indicated at 50. This tubular member is journaled in a bushing 52 supported in a rear wall 53 of the casing, and a front end portion of said tubular member is carried by a bushing 54 of a planetary gear carrier hub 55 which is mounted on an internally threaded member 56. A splined connection 57 exists between the parts 55 and 56, and said parts 56 is journaled coaxially of the casing by the inner race of a ball bearing unit 58.

Sun gear means for each of two planetary gear units 59 and 61 is provided by gear teeth 62 formed integrally with the tubular member 51. The first of said planetary gear units, 59, comprises a planet gear carrier 63 journaled on the tubular member 51 by a bushing 64. Carrier 63 has three circumferentially spaced planet gear shafts 65 upon which planet gears 66 are respectively journaled. A ring gear 67 of the planetary unit 59 is secured to the carrier 68 of the second planetary unit 61 by circumferentially spaced machine screws 69. As explained above, the hub 55 of this carrier 68 is splined at 57 to the internally threaded driven member 56.

Figures 3, 4:
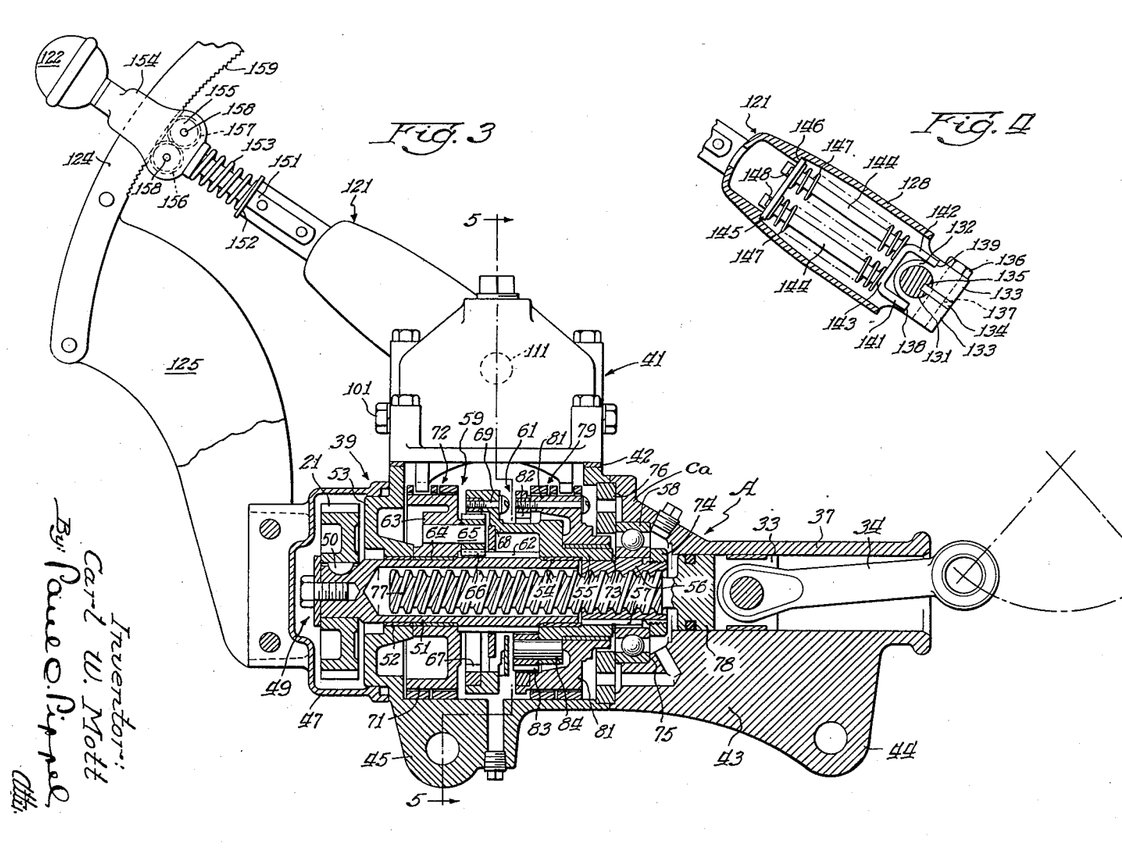
Fig. 3 is a vertical sectional view taken axially through one of the gearing components of the apparatus as indicated by the line 3—3 in Fig. 5.
Fig. 4 is a sectional view taken through a spring chamber formed integrally with a control lever of the apparatus, the view being taken on the line 4—4 of Fig. 5.

When a brake drum 71 formed integrally with the planet carrier 63 is constrained against rotation by a brake band 72, later to be explained in detail, the clockwise rotating driving structure 49, as viewed axially of the apparatus from the front, will impart counter-clockwise rotation to the planet gears 66. Since the gears 66 cannot planetate when the carrier is so constrained by the brake band 72, these gears in rotating counter-clockwise about their individual axes will impart counter-clockwise rotation to the ring gear 67 and to the carrier 68 and the internally threaded member 56. As can be seen in Fig. 3, the internally threaded member 56 is held against endwise movement by a snap ring 73 and an internally threaded ring 74 at opposite ends of the inner race of bearing unit 58. The bearing unit 58 is held against endwise displacement by the casing shoulder 75 and an annular plate 76 clamped between the main portion of the casing and the front end casting 43. Consequently the counter-clockwise rotated member 56 will advance an exteriorly threaded driven member 77 meshed therewith, and itself constrained against rotation, forwardly. An enlarged front end portion 78 of the exteriorly threaded driven member 77 forms part of the cross-head 33.

Engagement of the brake band 72 with the brake drum 71 always conditions the rear planetary gear unit 59 for causing endwise forward movement of the cross-head 33 in the manner just described. The forward planetary gear unit 61 is alternatively conditionable for causing the crosshead 33 to move endwise rearwardly. Such conditioning of the planetary unit 61 is incurred by braking engagement of a brake band 79 with a brake drum 81 which carries a ring gear 82 of the unit 61. Planetary gears 83 of the unit 61 are journaled upon spindles 84 anchored in the carrier 68. Planet gears 83 mesh mutually with the ring gear 82 and a portion of the sun gear means 62 so that when the drum 81 and the ring gear 82 are held against rotation, the clockwise rotating sun gear means 62, as viewed endwise from the front, will cause the planet gears to revolve in a clockwise direction at reduced speed about the principal axis of the unit. Thus the planet gear spindles 84 are correspondingly revolved and the carrier 68 is caused to rotate at the same reduced speed in a clockwise direction. Internally threaded member 56 rotates clockwise with the clockwise rotated carrier 68, thereby imparting endwise movement to the exteriorly threaded member 77 and to the cross-head 33 in an endwise rearward direction. Such rearward movement of the cross-head 33, incurred by application of the brake band 79 to the brake drum 81 for holding the latter stationary, acts through the connecting rod 34 and the arm structure 36, Figs. 1, 2, and 3, for pivoting the outer concentric rock-shaft structure 23 and the rock-shaft arms 32 to a clockwise limit as illustrated in Fig. 1. Forward movement of the cross-head 33 by the engagement of the brake band 72 for holding the brake drum 71 stationary will have the opposite effect of rotating the rock-shaft arms 32 in a counter-clockwise direction to a limit on the other side of the arms 31 with respect to which the arms 32 are illustrated in Fig. 1.

Figures 5, 6, 7, 8:
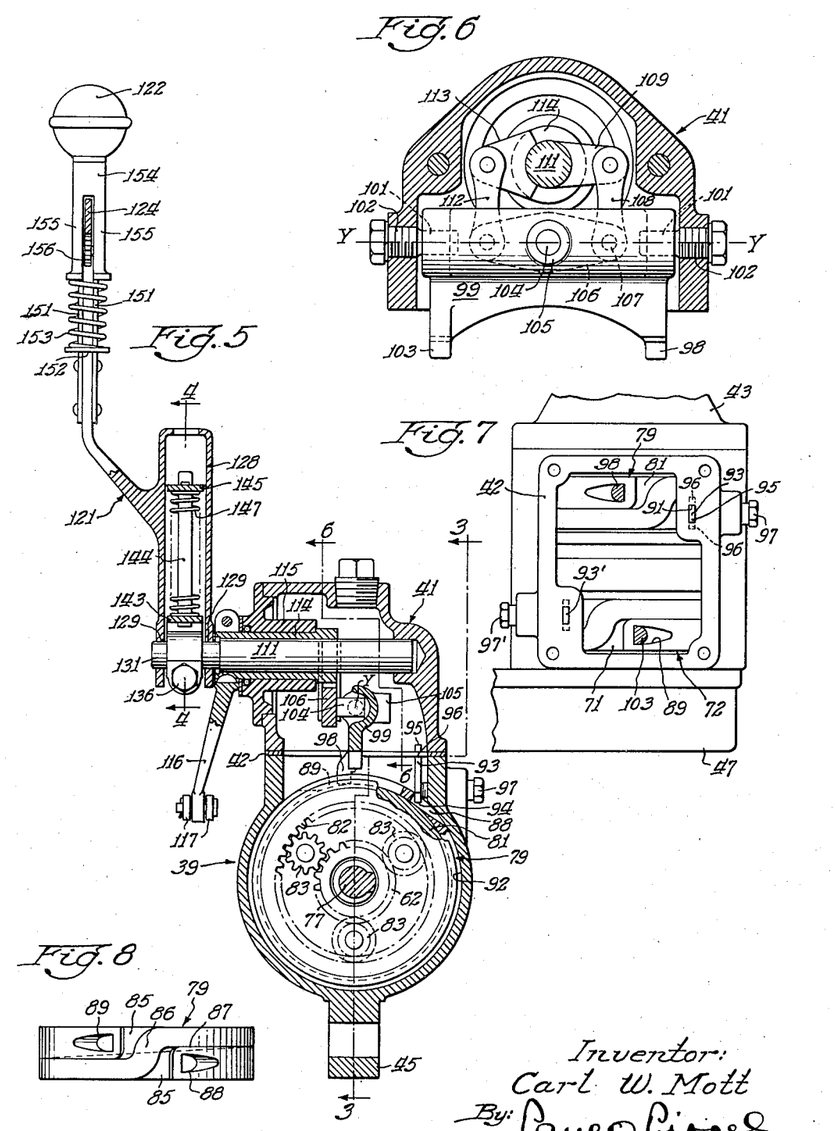
Fig. 5 is a vertical sectional view taken transversely through the unit A substantially on the line 5—5 of Fig. 3.
Fig. 6 is a sectional view taken on the line 6—6 of Fig. 5 for showing a portion of the control linkage of the apparatus.
Fig. 7 is a horizontal plan view of the main casing portion of one of the gearing components of the apparatus with an auxiliary portion of the casing removed of exposing brake bands which control brake drums of planetary gearing within the casing.
Fig. 8 is an elevational view looking radially of a brake band of an improved type employed in the apparatus.

Each of the brake bands 72 and 79 is constructed like the other. Brake band 79 is illustrated in Fig. 8. This brake band is formed from a perfectly cylindrical piece of stock material having notches 85 cut into opposite of its ends at circumferentially spaced positions for leaving an intervening portion 86 of the material. Following this operation the cylindrical band of material is cut to form a slot 87 extending circumferentially of the piece oppositely from the intervening material 86 and communicatively with the bottoms of the notches 85. In this manner a brake band is formed which is truly cylindrical when in the relaxed condition. Slots 88 and 89 are formed in opposite end portions of the resulting band by suitable machine operations.

The mounting for brake band 79 is illustrated in Figs. 5 and 7. This band is disposed about the brake drum 81 and has the notch 88 thereof disposed immediately beneath a hole 91 in the casing plate-like member 42. A cylindrical internal peripheral portion 92 of the casing registers radially with the brake band and is slightly smaller in diameter than the outer periphery of said band, whereby the band expands against the surface 92. Thus the surface 92 functions to support the released band 79 coaxially with the brake drum 81. By this arrangement the released band 79 can be supported with its inner periphery extremely close to the outer periphery of the drum without actually touching the drum with any significant magnitude of pressure. Anchorage means for one end of the band 79 comprises a tiltable member 93 having a lower end portion 94 projecting into the slot 88 and an upper end portion 95 projecting into the opening 91, Fig. 7. Shoulders 96 adjacent to the upper end portion 95 of the tiltable member 93 are adapted to abut against the under side of the plate-like member 42 for limiting upward movement of said member 93. Casing-mounted means manipulatable to regulate the tilt of the tiltable member 93 and hence the position of the anchorage end of said band 79 circumferentially of the drum 81 is in the form of a set screw 97.

The free end of the brake band 79 having the slot 89 therein is advanceable in a clockwise direction circumferentially of the drum 81, as viewed in Fig. 5, for tightening the band upon the drum, while circumferential movement of the anchorage end of the band is prevented by the anchorage means 93—97. Such circumferential movement of the free end of the band is obtained by a lever arm 98 having an end portion projecting into the slot 89. Arm 98 is part of a lever 99 pivotable about an axis Y and supported upon trunnion members 101, Fig. 6, at opposite ends. These trunnion members have threaded portions 102 screw threaded into the upper casing portion 41. The means for controlling the pivoted position of the lever 99 will be presently described. Said lever has a second arm, 103, for causing engagement of the brake band 72 when such lever is rotated on the trunnions 101 in the opposite direction to that above described for engaging the brake band 79 with its drum 81.

In Fig. 7 the brake band 72 is illustrated as being similarly mounted as the band 79. However, the band 72 is disposed in the casing so that its anchorage end, anchored to the casing by a tiltable member 93' corresponding to the member 93, is constrained against rotation in the opposite circumferential direction. Anchorage member 93' cooperates with a set screw 97' corresponding to the set screw 97 in the manner hereinabove explained, while the unanchored end of the band 72 is movable circumferentially of the drum 71 by means of the lever arm 103 for tightening the band upon said drum. When the lever 99 is in the neutral position illustrated in Figs. 5, 6, and 7, neither of the brake bands 72 nor 79 is tightened upon its drum, whereby neither of the planetary units 59 nor 61 is conditioned for causing driving force to be transmitted to the internally threaded member 56. Pivoting of the lever 99, as viewed in Fig. 5, in a counter-clockwise direction will advance the free end of the band 79 for applying it to the brake drum 81 and thereby conditioning the second planetary gearing unit, 61, for rotating the internally threaded member 56 in the direction for moving the cross-head 33 rearwardly, whereas clockwise rotation of the lever 99, as viewed in Fig. 5, will carry its arm 103 against the notch 89 therefor in the free end of the brake band 72 for applying this band in braking relation with the drum 71 to condition the planetary unit 59 for driving the internally threaded member 56 in the direction for moving the cross-head 33 forwardly.

Lever 99 is movable about its axis Y by means of an arm in the form of a pin 104 extending perpendicularly to the arms 98 and 103 and anchored in a socket 105 of such lever. The free end of the arm 104 is pivotally connected with an intermediate portion of a differential force-applying link 106. One end of the link 106 is pivotally connected at 107, Fig. 6, with a vertical link 108 which is pivotally connected at its upper end with an arm 109 which is constrained for rotation with a manually operated control shaft 111. The opposite end of the link 106 is pivotally connected with the lower end of a vertical link 112, and the upper end of this link is pivotally connected with an arm 113 constrained for rotation with a tubular shaft 114 in which the manually operated shaft 111 is mounted for rotation. Tubular shaft 114 is mounted for rotation in a casing bearing 115 shown in Fig. 5. Tubular shaft 114 has an arm 116 keyed thereto, and the free end of this arm is connected by a link 117, Fig. 2, with a pivotal anchorage 118 on the rock-shaft arm structure 36.

Clockwise rotation of the manual control shaft 111, as viewed in Fig. 6, will force the right end of the link 106, Fig. 6, downwardly, and assuming the left end of this link 106 to be held against vertical movement by the linkage 112—113 etc., this lowering of the right end of said link 106 will lower the free end of the arm 104 and thereby pivot the lever 99, Fig. 5, counter-clockwise for engaging the brake band 79 with the drum 81. In this manner the forward planetary gear unit 61 is conditioned for driving the cross-head 33 rearwardly and thereby pivoting the rock-shaft arms 32 and 36 clockwise as viewed in Fig. 1. This clockwise pivoting of the rock-shaft arm structure 36 ensuing from the clockwise manual movement of the shaft 111 in Fig. 6 will incur rearward movement of the link 117 of unit A and consequent rearward movement of the lower end of the arm 116 (toward the observer as viewed in Fig. 5) and thereby cause clockwise rotation of the tubular shaft 114 as viewed in Fig. 6. This ensuing clockwise rotation of the tubular shaft 114 will cause lifting of the left end of the link 106, as viewed in Fig. 6, and ultimate lifting of the mid-portion of the link 106 to the neutral position which it occupied prior to the manual clockwise rotation of the shaft 111. When this neutral position of the mid-section of link 106 has been reattained, the lever 99 will be reestablished in its neutral position. The length of link 117, as well as the dimensions of the parts connected therewith for rotating the sleeve shaft 114 from the rock-shaft arm structure 36, is so selected that the neutral position of the lever 99 for stopping further rearward movement of the cross-head and clockwise rotation of the arm structure 36, as viewed in Fig. 1, will occur when such movement attains a desired correlation with the amount of initiating manual movement imparted to the shaft 111.

Manual rotation of the shaft 111 counter-clockwise, as viewed in Fig. 6, will raise the right end of the horizontal link 106 as well as the mid-section of this link and thereby cause clockwise rotation of the lever 99 as viewed in Fig. 5. As explained above, this counter-clockwise rotation of the lever 99 will incur engagement of the brake band 72 and condition the rear planetary unit 59 for moving the cross-head 33 forwardly and thereby pivoting the rock-shaft arm structure 36 counter-clockwise as viewed in Fig. 1. As a consequence of this counter-clockwise pivoting of the rock-shaft arm structure 36, the link 117 of unit A, as viewed in Fig. 1, will be moved forwardly and thereby impart movement of the arm 116, Fig. 5, for pivoting the tubular shaft 114, Fig. 6, counter-clockwise to lower the mid-portion of the link 106 and reestablish the neutral position of the lever 99 upon the rock-shaft arm structure 36 having pivoted counter-clockwise, as viewed in Fig. 1, a distance correlated with the amount of initiating manual movement imparted to the shaft 111.

It is therefore the function of unit A of the apparatus to utilize power received from a constantly rotating engine-driven gear 14, Fig. 1, for selectively rotating the rock-shaft arm structure 32—36 either clockwise or counter-clockwise, as viewed in Fig. 1, in variable amounts correlated with the clockwise or counter-clockwise rotation of a manually operated control shaft 111. Apparatus unit B has the same function with respect to rock-shaft arm structures 31—38 and operates identically in attaining this function.

Separate levers 121 are connected with the control shafts 111 of the auxiliary power-transmitting units A and B. These levers 121 and their connecting means with their respective shafts 111 are constructed similarly although these levers are faced oppositely endwise of said shafts so as to place knobs 122 on their upper ends so that their paths of movement are sufficiently contiguous that these knobs can be concurrently engaged by one hand of an operator for simultaneous movement. Levers 121 operate over quadrant straps 123 and 124 secured at their rear ends to a bracket 125 which is mounted on the casing end casting 47. The front ends of the quadrant straps 123 and 124 are clamped by a rivet 126 or the like against opposite ends of a tubular spacer member 127.

Referring now to the control lever 121 which is associated with the unit A, the means for connecting such lever with its manually controlled shaft 111 includes a spring chamber 128, Figs. 4 and 5, formed integrally with the lower end of this lever. Bearings 129 in opposite walls of this spring chamber pivotally receive a reduced end section 131 of the shaft 111. Between these opposite walls of the spring chamber a split ring 132 is fixed to said shaft end section 131. Said ring 132 has opposed apertured ears 133 which receive a key member 134 therebetween which projects into an axial groove 135 in the shaft section 131. Dislodgment of the key from said groove is prevented by a cap screw 136 turned into the apertured ears 133 and extending through a hole 137 in said key.

Split collar 132 has shoulders 138 and 139 for the abutment of legs 141 and 142 of a bridge member 143. This bridge member has two spring guide stems 144 anchored therein and projecting upwardly in the spring chamber 128 through respective holes in a plate 145 held against a seat 146 by expansion springs 147 about the stems 144. Cotter keys 148 in the stems above the plate 145 enable the plate and the bridging member 143 to hold the springs captive on the guides 144 prior to the disposal of these parts within the chamber 128.

It is the purpose of the springs 147 to enable their associated lever 121 to be rotated relatively to their associated shaft 111 while these springs exert a force tending to rotate said shaft in the direction of rotative displacement of the lever. For example, if the lever 121 and spring chamber 128 illustrated in Figs. 4 and 5 were to be rotated clockwise as viewed in Fig. 4, the shaft 111 which initially resists rotation would remain relatively fixed while the end 141 of the bridging member 143 would be raised from the shoulder 138 and the end 142 of said bridging member would react on the shoulder 139 for compressing the springs and projecting the guide stems 144 upwardly through the plate 145. The pressure exerted by the springs through the bridge member end portion 142 onto the shoulder 139 would tend to rotate the shaft 111 also in the clockwise direction. This condition will prevail until the ensuing movement of the cross-head 133 causes movement of the differential link 106 for permitting the shaft 111 to rotate under the force imparted thereto by the compressed springs 147 and the diminution in their compression as the bridging upper end 141 approaches its seat 138. Should the lever 121 and its spring chamber 128 be rotated counter-clockwise as this chamber is viewed in Fig. 4, the bridge member end 142 would be lifted from its seat 139, while the end 141 is urged against its seat 138 by the springs 147 for yieldably urging the shaft 111 to pivot in the direction of pivoting of the lever. The sprigns 147 would then remain so additionally compressed until the ensuing movement of the cross-head 133 had caused the shaft 111 to rotate in the direction and amount that the lever 121 had been manually rotated.

If the lever 121 were rigidly connected with the control shaft 111 instead of being connected therewith through the yieldable connection including the springs 147, the distance such lever could be moved subsequent to the engagement of the brake band actuated thereby would depend upon the ensuing speed of movement of the cross-head 133 and the speed of the resulting movement of the differential link 106 tending to reestablish the neutral position of the mid-section of this lever. However, by using the yieldable connection between the lever 121 and the control shaft 111, the operator can promptly set the lever to any position desired for predetermining the amount of movement of the cross-head 133 which may move at any speed for subsequently reestablishing the radially alined positions of the shaft 111 and lever 121 illustrated in Fig. 4.

Devices for automatically locking each of the levers 121 in any set position along its quadrant strap 124 and for automatic manual release incident to movement of the knobs are illustrated in Figs. 3 and 5. The lever 121 shown in these two figures can be seen to have a pair of strap-like extension members 151 secured to the cast portion of the lever and of less width than the cast portion so as to enable the end of such cast portion to form a seat 152 for an end of a compression spring 152 surrounding the extensions 151. Said extensions 151 straddle their associated quadrant strap 124 and project into a gear holder 154 having opposed sections 155 also straddling the strap 124. Knob 122 is fastened securely to the upper end of the gear holder 154. A pair of gears 156 and 157 are disposed between the holder sections 155 where they are journaled on shafts 158 extending between these sections. The teeth of gears 156 and 157 mesh with one another and are normally pressed into mesh with teeth 159 on the strap 124 by the spring 153. So long as both gears 156 and 157 are meshed with the quadrant strap teeth 159, the lever 121 is held against movement. Should the operator grasp the knob 122 and exert pressure thereon for pivoting the lever 121 clockwise as viewed in Fig. 3, the gear holder 154 would be tilted incident to compressing the spring 153 slightly to demesh the gear 157 from the quadrant strap teeth 159, whereby continued pressure in the clockwise direction on the knob 122 would cause the gear 156 to roll along the quadrant strap while driving the gear 157 idly. When the lever has been set at the desired point, the knob 122 will be released whereupon the spring 153 will reestablish the meshed condition of both gears 156 and 157 with the quadrant strap teeth and prevent accidental displacement of the lever. Counter-clockwise pressure upon the knob 122 would disengage the gear 156 from mesh with the quadrant strap teeth so that the lever could be moved counter-clockwise while the gear 157 rotated the gear 156 idly. Upon release of the knob 121 the spring 153 would again reestablish the locked position wherein both gears 156 and 157 mesh with the quadrant strap teeth. This locking apparatus serves to hold the lever 121 in any desired position following movement of the lever for compressing the springs 147, Figs. 4 and 5, until the ensuing movement of the cross-head 133 has relieved the tension on the springs 147, thus avoiding the necessity of the operator manually holding the lever 121 in an advanced or retracted position until the ensuing movement of the cross-head has relieved such tension on the springs 147.

In Fig. 1 it can be seen that the bearing member 161 for the forward end portion of the drive shaft 18 for the units A and B has the bearing 162 therein mounted eccentrically with respect to the circular outer peripheral portion 163 of this bearing member that is journaled in a wall of the clutch compartment 15. Bearing member 161 has an arm 164 which, when a pin 165 therein is pulled rearwardly from within a hole 166 in the wall of said compartment, can be manipulated for pivoting the bearing member 161 about the axis of the casing bearing receiving the peripheral section 163. Such pivoting of the bearing member 161, because of the eccentricity of the bearing 162 therein, will move the forward end section of the shaft laterally for demeshing the gear 17 from the gear 14 incident to flexing the shaft 18. A second casing hole, not shown, is adapted to receive the pin 165 for retaining the bearing member 161 in the rotated position with the gears 17 and 14 demeshed.

Having thus described a single preferred form of the invention with the view of clearly illustrating the same, I claim:

1. In a power transmitting device, a casing, a cross-head bearing extending endwise from said casing, an open-ended tubular driving structure within and journaled in said casing for continuous rotation in one direction coaxially of said cross-head bearing and having its open end disposed toward said bearing, a cross-head reciprocable in said cross-head bearing, an exteriorly threaded member reciprocable with the cross-head and projecting endwise therefrom into the tubular driving structure, an endwise-constrained rotatable internally threaded member disposed between the driving structure and said cross-head and having its threads meshed with those of the exteriorly threaded member whereby rotation of such internally threaded member in opposite directions causes endwise movement of the exteriorly threaded member and the cross-head in respectively opposite directions, sun gear means circumscribing said driving structure and constrained for unidirectional rotation therewith, first and second planetary gear units each comprising a ring gear, a carrier and planet gears journaled on said carrier and in driving relation between their respectively associated ring gear and respective portions of said sun gear means, means constraining the carrier of the second unit to rotate in unison with the ring gear of the first unit and with said internally threaded member, and brake means for selectively constraining rotation of the carrier of the first unit or the ring gear of the second unit.

2. In a power transmitting device; a plural part casing having a main part with a principal axis, a controls-containing part spaced radially from said axis, and an intermediate sheet-like part assembled between the first-named parts, said intermediate part having slots in portions thereof projecting interiorly of the casing and spaced axially of the main casing part; a rotatable driving structure mounted coaxially in the main casing part; a driven member mounted in the main casing part for forward or reverse rotation coaxially thereof; planetary drive gearing coaxially in the main casing part and selectively establishable in forward or reverse driving relation between said driving structure and the driven member, said gearing including axially spaced forward and reverse brake drums independently rotatable coaxially of said structure, one of said drums being operable to establish the forward driving relation of the gearing when constrained against rotation in one direction and the other brake drum being operable to establish the reverse driving relation of the gearing when constrained against rotation in the opposite direction, said gearing being neutral to establish neither driving relation when neither drum is constrained; brake bands respectively cooperable with said brake drums, each band having an anchored end portion from which it extends circumferentially of its associated drum in the direction its drum tends to rotate when constrained and having an opposite end portion displaceable in said circumferential direction to frictionally apply such band to its drum to brake the same with a servo action, said brake bands having slots in their end portions; means for anchoring the anchorage ends of said bands to the casing comprising tiltable members each having one end portion projecting into a respective of the anchorage end slots of said bands and each having a second portion projecting into a respective of the intermediate member slots to be held captive thereby while facilitating tilting of such tiltable members so the one portion of each can bear against a side of its associated brake band slot at various positions of adjustment thereof circumferentially of its associated drum, and casing-mounted means manipulatable to regulate the tilt of said tiltable members and hence the position of the anchorage ends of said bands in said zones; and means for selectively applying said bands to their drums comprising a lever pivoted in said casing about an axis parallel with said principal axis and having arms projecting respectively into the slots at the other ends of said bands for selectively applying said bands to their drums when the lever is rotated in respectively opposite directions from a neutral position, a differential link having an intermediate portion connected with said lever to pivot the same from its neutral position in accordance with the direction of displacement of said intermediate portion from a neutral position circumferentially of the lever axis, coaxially rotatable shafts in said controls-containing casing part, means connecting said shafts with respective end portions of said differential link for displacing such end portions in opposite directions circumferentially of the lever axis in accordance with opposite directional rotation of their associated of said shafts, means operably connecting one of said shafts with said driven member to correlate the position of the associated lever end portion with the amount of advance or retraction of said driven member, the other of said shafts being manually operable to displace its associated lever end portion and correspondingly displace the lever intermediate portion from its neutral position while the other end portion reacts against the connecting means therewith to cause selective application of the brake bands in accordance with the direction of manual rotation of said other shaft, and the connecting means at said other end of the lever being operable by the ensuing movement of said driven member to displace said other end portion in the direction to reestablish the neutral position of the intermediate lever portion and of said lever when the driven member is moved an amount correlated with the amount of manual rotation of said other shaft.

3. In a power transmitting device; a rotatable driving structure; a driven member mounted for forward or reverse rotation coaxially with said driving structure; a planetary gearing layout connected between said structure and said driven member and including brake bands for braking respectively associated elements of such gearing to condition the same for driving the driven member in respectively opposite directions from the driving structure, said brake bands having end portions oppositely movable for applying the same in braking relation with their said elements; and control means for said brake bands comprising a lever having arms projecting respectively into operating relation with said ends of the brake bands, said lever being pivotable oppositely from a neutral position wherein neither arm applies its associated brake band and being operable when pivoted in one direction from neutral to cause application of one band and being operable when pivoted in the opposite direction from neutral to cause application of the other brake band, a differential link having an intermediate portion connected with said lever to pivot the same from its neutral position in accordance with the direction of displacement of said intermediate portion from a neutral position thereof circumferentially of the lever axis, coaxially rotatable control shafts, means connecting said shafts with respective end portions of said link for displacing such end portions in opposite directions circumferentially of the lever axis in accordance with opposite directional rotation of their associated of said shafts and to correspondingly displace the intermediate link portion when either end portion opposite to that displaced is constrained against displacement, means operably connecting one of said shafts with said driven member to correlate the position of the associated lever end portion with the amount of advance or retraction of said driven member, the other of said shafts being manually operable to displace its associated lever end portion and correspondingly displace the lever intermediate portion from its neutral position while the other end portion reacts against the connecting means therewith to cause selective application of the brake bands in accordance with the direction of manual rotation of said other shaft, and the connecting means at said other end of the lever being operable by the ensuing movement of said driven member to displace said other end portion in the direction to reestablish the neutral position of the intermediate lever portion and of said lever when the driven member is moved an amount correlated with the amount of manual rotation of said other shaft.

CARL W. MOTT.

REFERENCES CITED

The following references are of record in the file of this patent:

UNITED STATES PATENTS

| Number | Name | Date |
|---|---|---|
| 764,896 | Maxim | July 12, 1904 |
| 1,790,243 | Nilson | Jan. 27, 1931 |
| 1,847,693 | Kindervater | Mar. 1, 1932 |
| 1,887,832 | Brown | Nov. 15, 1932 |
| 1,891,545 | Kindervater | Dec. 20, 1932 |
| 1,975,835 | Farkas | Oct. 9, 1934 |
| 2,182,386 | Patterson | Dec. 5, 1939 |
| 2,283,476 | Waibel | May 19, 1942 |
| 2,387,713 | Bradford | Oct. 30, 1945 |
| 2,403,092 | Lear | July 2, 1946 |
| 2,405,338 | Werner | Aug. 6, 1946 |

FOREIGN PATENTS

| Number | Country | Date |
|---|---|---|
| 680,748 | France | May 5, 1930 |